Patented July 23, 1929.

1,722,210

UNITED STATES PATENT OFFICE.

WILLIAM H. GRIMDITCH, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

METHOD OF PREPARING BATTERIES FOR SERVICE.

No Drawing.   Application filed March 5, 1923.   Serial No. 623,065.

In storage batteries made up of dry charged plates and substantially dry separators of wood or other porous material as described in an application for U. S. Patent of Holland and Grimditch, Serial No. 622,845 filed March 5, 1923, the internal resistance after filling with the proper electrolyte is too great to allow of withdrawing current at high discharge rates without an excessive drop in voltage at the cell terminals, nor will the voltage attain its full value even though considerable time is first allowed for the electrolyte to soak into the plates and separators.

As a result of observation and experiment I have discovered that the chief reason for the high resistance of dry separators of wood or other porous material, even though the separators be given any of the usual treatments before drying to improve their porosity, as compared with similar separators which have been kept wet following the same porosity treatment, is that they contain trapped, occluded or adsorbed air. This air being only slightly soluble in the battery electrolyte and not readily displaced by the same, interposes resistance to the diffusion of and permeation of the wood by electrolyte and to the passage of electric current through the separators, under ordinary conditions.

Carrying my experiments further, I have found that even in a battery cell made up with plate separators of perforated hard rubber and having no wood or other absorbent material between the plates, the electrolyte, when added, does not readily displace the air in the perforations of the separators and in the pores of the plates, under ordinary conditions. Consequently a dry charged battery, even when made up with such perforated separators, may not be up to the required standard of performance initially or may require too long a soak after the initial filling with electrolyte to realize the full commercial advantage of a dry charged battery.

One object of my invention, therefore, is to provide an improved storage battery and the invention especially contemplates a novel method for the removal or displacement of air in the separators and plates and the replacement of the same with electrolyte.

Another object of the invention is to provide an effective process for quickly preparing dry charged batteries for use and especially for services requiring high discharge rates.

Another object of the invention is to provide a novel method of cutting down the required soaking time and improving the initial performance of batteries originally assembled with air-containing separators or plates.

In carrying out my invention I either directly exhaust the greater part of the air from within the battery cells by means of a vacuum pump or I indirectly create a vacuum in the pores of the separators, so that the electrolyte when placed in the cells is quickly drawn into said pores, thus establishing paths of good electrical conductivity.

When a battery is to be treated directly for the removal of the air in its separators, its cells are preferably first filled with the desired amount and kind of electrolyte and it is then subjected to a vacuum in any desired manner or by any suitable means, with the result that the air pressure on the surface of the liquid in the battery cells is reduced. Thereupon the air within the separators and plates of the battery expands, so that the greater part of it forces its way out and rises through the liquid as bubbles. This operation requires but a few minutes and upon the readmission to the battery of air at atmospheric pressure, the small amount of residual air in the separators and plates contracts so that the electrolyte is drawn or forced into the pores of these elements.

If the battery cells are air-tight they may be connected directly with an exhaust pump by means of tubing and suitable couplings, thus eliminating the necessity for a container in which the battery must otherwise be placed for the vacuum treatment. Under these conditions, the volume of air required to be exhausted is reduced, so that less time is required or a smaller pump may be used. In either case, if desired, the air may be withdrawn from the separators and plates of the battery cells before, rather than after, the electrolyte is added, in which case suitable connections are provided through which the electrolyte is forced into the exhausted cells by the pressure of the surrounding atmosphere.

As an example of an indirect method of removing trapped air and drawing electrolyte into the pores of battery separators and plates, I may fill the battery cells with steam and continuing its delivery until the air in the separators has been displaced thereby. The electrolyte is then immediately delivered to the cells and is drawn into the pores of the separators and plates owing to the condensation of the steam therein, which tends to create a vacuum.

Similarly, soluble gases, such as carbon dioxide or ammonia, may be introduced into the battery cells and caused to displace the air trapped in the separators and plates. When the electrolyte is added, these gases dissolve therein, tending to create vacua in the separators and plates, so that as before, the electrolyte replaces said gas in the pores of these elements.

If desired a soluble gas may be generated in the separator pores by the action of the filling electrolyte. For example, if the porous separators before use be impregnated with a salt of carbonic acid such as sodium carbonate or bi-carbonate, upon adding sulphuric acid electrolyte, the carbonate salt is changed into a sulphate salt and carbon dioxide gas is liberated to displace air from the pores of the separators. Subsequently this gas dissolves in the electrolyte and is replaced by the latter as above described.

It is to be noted that this invention is not limited to batteries having wood separators since it may be advantageously employed for the treatment of batteries having the so-called "threaded rubber" or any other kind of separators which contain air. Nor is the invention limited to batteries made up with dry charged plates since it may be used to reduce or eliminate the soaking time usually required as well as to improve the initial performance of batteries made up in the ordinary way with plates which require to be charged before they can be discharged. The method, however, is particularly valuable for use in putting into service dry charged batteries.

By employing the method of treatment noted with a dry charged battery, the separators and plates quickly become saturated with electrolyte and the battery is therefore capable of delivering a high discharge current at good terminal voltage within a relatively short time after commencing to prepare the battery for service. My method of preparation improves the initial discharge capacity as well as the terminal voltage, since more electrolyte is forced into the plates, as well as into the separators, than would otherwise be present.

I claim:

1. The method of preparing a battery for service which consists in delivering steam thereto and thereafter supplying the electrolyte to the battery to replace the steam in the pores of the plates and separators thereof.

2. The method of preparing dry charged batteries for service, which consists in filling the pores in the plates and separators with steam, condensing the steam, and permitting electrolyte to fill the voids evacuated by the condensed steam.

3. The method of preparing for service a battery having dry porous separators, which consists in filling the pores of the separators with steam, condensing the steam, and permitting electrolyte to fill the voids evacuated by the condensed steam.

4. The method which consists in evacuating the plates of a battery by filling the pores of said plates with steam, condensing the steam, and allowing electrolyte to fill the voids evacuated by the condensed steam.

5. The method of preparing dry porous storage battery separators for service, which consists in filling the pores of said separators with steam, condensing the steam, and allowing electrolyte to fill the voids evacuated by the steam in condensation.

WILLIAM H. GRIMDITCH.